United States Patent
Mukae (10) Patent No.: US 12,454,370 B2
(45) Date of Patent: Oct. 28, 2025

(54) SATELLITE CONSTELLATION MAINTAINING METHOD, SATELLITE CONSTELLATION, ORBITAL DROPPING METHOD, AND ARTIFICIAL SATELLITE

(71) Applicant: Mitsubishi Electric Corporation, Tokyo (JP)

(72) Inventor: Hisayuki Mukae, Tokyo (JP)

(73) Assignee: MITSUBISHI ELECTRIC CORPORATION, Tokyo (JP)

( * ) Notice: Subject to any disclaimer, the term of this patent is extended or adjusted under 35 U.S.C. 154(b) by 0 days.

(21) Appl. No.: 18/291,247

(22) PCT Filed: Jul. 19, 2022

(86) PCT No.: PCT/JP2022/027982
§ 371 (c)(1),
(2) Date: Jan. 23, 2024

(87) PCT Pub. No.: WO2023/008245
PCT Pub. Date: Feb. 2, 2023

(65) Prior Publication Data
US 2024/0359829 A1    Oct. 31, 2024

(30) Foreign Application Priority Data
Jul. 27, 2021    (JP) .................................. 2021-122595

(51) Int. Cl.
*B64G 1/24*    (2006.01)
*B64G 1/10*    (2006.01)

(52) U.S. Cl.
CPC ......... *B64G 1/2427* (2023.08); *B64G 1/1085* (2013.01)

(58) Field of Classification Search
CPC .. B64G 1/2427; B64G 1/1085; B64G 1/1021; B64G 1/242; B64G 1/10
See application file for complete search history.

(56) References Cited

U.S. PATENT DOCUMENTS

| | | | |
|---|---|---|---|
| 5,813,634 A * | 9/1998 | Pizzicaroli | B64G 1/1085 455/12.1 |
| 6,157,896 A * | 12/2000 | Castles | H04B 7/18552 342/357.68 |
| 7,437,246 B2 * | 10/2008 | Kelly | G08G 3/02 701/301 |

(Continued)

FOREIGN PATENT DOCUMENTS

WO    2020/158505 A1    8/2020

OTHER PUBLICATIONS

International Search Report and Written Opinion mailed on Oct. 11, 2022, received for PCT Application PCT/JP2022/027982, filed on Jul. 19, 2022, 8 pages including English Translation.

*Primary Examiner* — Joshua D Huson
*Assistant Examiner* — Vicente Rodriguez
(74) *Attorney, Agent, or Firm* — XSENSUS LLP (57) ABSTRACT

When a deorbiting satellite, which is one of artificial satellites belonging to a first satellite constellation, deorbits and drops from an orbit of a first orbital altitude zone, a second satellite constellation widens a relative angle of any adjacent two orbital planes of a plurality of orbital planes and thereby allocates a free orbit area in a second orbital altitude zone. The deorbiting satellite passes through the free orbit area of the second orbital altitude zone.

20 Claims, 7 Drawing Sheets

(56) References Cited

U.S. PATENT DOCUMENTS

| | | | |
|---|---|---|---|
| 8,226,046 B2* | 7/2012 | Poulos | B64G 1/6462 244/172.4 |
| 2019/0389602 A1* | 12/2019 | Schilling | B64G 1/26 |
| 2020/0217669 A1* | 7/2020 | Hu | G06F 16/29 |
| 2022/0081132 A1 | 3/2022 | Mukae | |
| 2022/0161944 A1* | 5/2022 | Rhoads | H04B 7/195 |

* cited by examiner

Fig.1

100:SATELLITE CONSTELLATION SYSTEM

101:FIRST SATELLITE CONSTELLATION

102:SECOND SATELLITE CONSTELLATION

100: SATELLITE CONSTELLATION SYSTEM

101: FIRST SATELLITE CONSTELLATION

102: SECOND SATELLITE CONSTELLATION

120 GROUND FACILITY

122

121 SATELLITE CONTROL APPARATUS

SATELLITE CONSTELLATION MAINTAINING METHOD, SATELLITE CONSTELLATION, ORBITAL DROPPING METHOD, AND ARTIFICIAL SATELLITE

CROSS-REFERENCE TO RELATED APPLICATIONS

The present application is based on PCT filing PCT/JP2022/027982, filed Jul. 19, 2022, which claims priority from Japanese Patent Application No. 2021-122595, filed Jul. 27, 2021, the entire contents of each are incorporated herein by reference.

TECHNICAL FIELD

The present disclosure relates to satellite constellations.

BACKGROUND ART

Plans of satellite mega-constellations in which satellite groups perform service operation in cooperation at the same nominal orbital altitude are increasing and gaining steam with the number of satellites almost reaching fifty thousand in total.

For these satellite mega-constellations to continue business, it is required to establish a method of deorbiting a life-completed satellite and a failed satellite from their orbits, allocating a free area, and injecting a succeeding satellite to the orbit.

Healthy deorbiting performed by a life-completed satellite is called Post Mission Disposal (PMD).

Deorbiting that cannot be performed by a failed satellite by itself is called Active Debris Removal (ADR), and is actively performed by using a debris removal satellite.

A process from a time when a satellite flying at high altitude deorbits until the satellite enters the atmosphere to burns up is referred to as an orbital dropping process. In the orbital dropping process, since a satellite passes through an orbital altitude zone of mega-constellation satellite groups flying at low altitude, there is a danger of a collision between satellites.

Normally, in a mega-constellation, a plurality of orbital planes are formed exhaustively and uniformly in the sky, and a plurality of satellites uniformly fly for each orbital plane.

Thus, when deorbiting is performed without control, the orbital plane from which the satellite deorbits and the flying position of the satellite at the time of deorbiting become random, thereby making a situation in which it is difficult to predict a danger of which satellite on which orbital plane in a lower layer the deorbiting satellite may collide with.

Even if prediction of a danger can be made, under an environment in which several tens of thousands satellites randomly deorbit with alternation of generation, a danger alert is issued with enormous frequency, and it is difficult for each satellite to take an avoidance action against each danger alert.

Patent Literature 1 discloses a satellite constellation formation system of avoiding a collision risk by forming a plurality of orbital planes at different orbital altitudes.

CITATION LIST

Patent Literature

Patent Literature 1: WO 2020/158505

SUMMARY OF INVENTION

Technical Problem

The present disclosure has an object of allowing avoidance of a collision between satellites when an artificial satellite deorbits.

Solution to Problem

In a satellite constellation maintaining method according to the present disclosure, a first satellite constellation is operated in a first orbital altitude zone, a second satellite constellation is operated in a second orbital altitude zone lower than the first orbital altitude zone and forms a plurality of orbital planes, when a deorbiting satellite, which is one of artificial satellites belonging to the first satellite constellation, deorbits and drops from an orbit of the first orbital altitude zone, the second satellite constellation widens a relative angle of any adjacent two orbital planes of the plurality of orbital planes and thereby allocates a free orbit area in the second orbital altitude zone, the deorbiting satellite passes through the free orbit area of the second orbital altitude zone, and a succeeding satellite, which is an artificial satellite serving as a replacement of the deorbiting satellite, is injected to the orbit of the first orbital altitude zone.

Advantageous Effects of Invention

According to the present disclosure, it is possible to avoid a collision between satellites when an artificial satellite deorbits.

DESCRIPTION OF EMBODIMENTS

In embodiments and drawings, identical or corresponding components are provided with the same reference numeral. Description of a component provided with the same reference numeral as that of a described component is omitted or simplified as appropriate.

Embodiment 1

A satellite constellation system 100 is described based on FIG. 1 to FIG. 5.

Description of Structure

Figure 1:
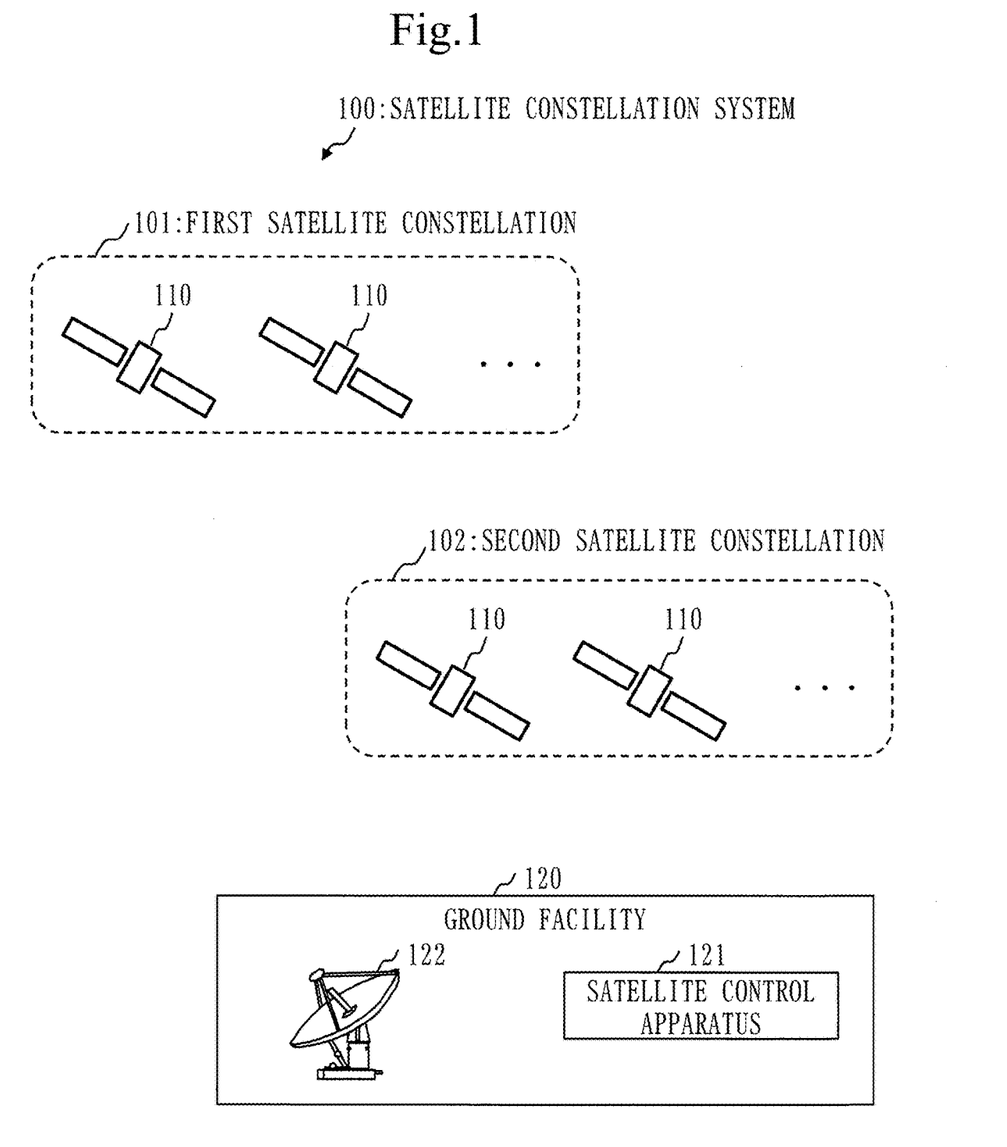
FIG. 1 is a diagram of structure of a satellite constellation system 100 in Embodiment 1.

The structure of the satellite constellation system 100 is described based on FIG. 1.

The satellite constellation system 100 includes a plurality of satellite constellations.

Each satellite constellation is configured of a plurality of artificial satellite groups, forming a plurality of orbital planes.

The plurality of artificial satellite groups fly in orbits on different orbital planes in the same orbital altitude zone.

Each artificial satellite group is configured of a plurality of artificial satellites 110.

One of the plurality of satellite constellations is referred to as a first satellite constellation 101.

An orbital altitude zone where the first satellite constellation 101 is operated is referred to as a first orbital altitude zone. Each artificial satellite 110 of the first satellite constellation 101 flies in the first orbital altitude zone.

Among the plurality of satellite constellations, one of satellite constellations operated in an orbital altitude zone lower than the first orbital altitude zone is referred to as a second satellite constellation 102.

An orbital altitude zone where the second satellite constellation 102 is operated is referred to as a second orbital altitude zone. Each artificial satellite 110 of the second satellite constellation 102 flies in the second orbital altitude zone.

The satellite constellation system 100 includes a ground facility 120.

The ground facility 120 includes a satellite control apparatus 121 and a communication apparatus 122.

The satellite control apparatus 121 is a computer including hardware such as a processing circuitry and an input/output interface. The satellite control apparatus 121 is connected via the input/output interface to the communication apparatus 122. The satellite control apparatus 121 generates various commands for each artificial satellite 110 to control each satellite constellation.

The communication apparatus 122 communicates with each artificial satellite 110. Specifically, the communication apparatus 122 transmits various commands to each artificial satellite 110.

Figure 2:
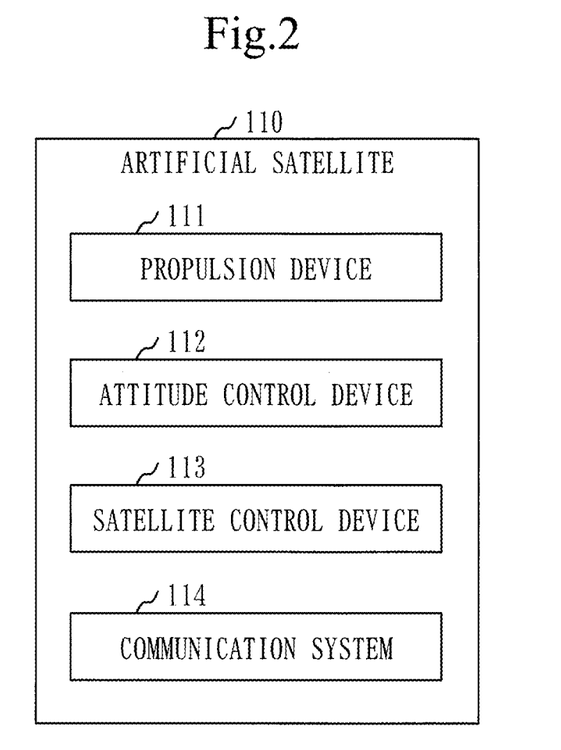
FIG. 2 is a diagram of structure of an artificial satellite 110 in Embodiment 1.

The structure of the artificial satellite 110 is described based on FIG. 2.

The artificial satellite 110 includes a propulsion device 111, an attitude control device 112, a satellite control device 113, and a communication system 114.

The propulsion device 111 is a device which provides a propulsion force to the artificial satellite 110, and adjusts the speed of the artificial satellite 110. Specifically, the propulsion device 111 is an electrical propulsor. For example, the propulsion device 111 is an ion engine or a Hall thruster.

The attitude control device 112 is a device for controlling attitude elements such as the attitude of the artificial satellite 110 and the angular velocity of the artificial satellite 110. The attitude control device 112 changes each attitude elements to a desired direction. Alternatively, the attitude control device 112 maintains each attitude elements in a desired direction. The attitude control device 112 includes an attitude sensor, an actuator, and a controller. The attitude sensor can be a gyroscope, an earth sensor, a solar sensor, a star tracker, a thruster, a magnetic sensor, and the like. The actuator can be an attitude control thruster, a momentum wheel, a reaction wheel, a control moment gyro, and the like. The controller controls the actuator by following measurement data of the attitude sensor or various commands from the ground facility 120.

The satellite control device 113 is a computer including hardware such as a processing circuitry and an input/output interface, and controls the artificial satellite 110.

The communication system 114 includes a satellite-targeted communication device and a ground-targeted communication device. The satellite-targeted communication device is a communication device for communicating with another artificial satellite 110. The ground-targeted communication device is a communication device for communicating with the ground facility 120.

The processing circuitry included in the satellite control device 113 and the satellite control apparatus 121 is described.

The processing circuitry may be dedicated hardware or a processor which executes a program stored in memory.

In the processing circuitry, part of the functions may be implemented by dedicated hardware and the remaining functions may be implemented by software or firmware. That is, the processing circuitry can be implemented by hardware, software, firmware, or a combination of these.

The dedicated hardware is, for example, a single circuit, a composite circuit, a programmed processor, a parallel-programmed processor, an ASIC, an FPGA, or a combination of these.

ASIC is an abbreviation of Application Specific Integrated Circuit.

FPGA is an abbreviation of Field Programmable Gate Array.

Description of Operation

In the satellite constellation system 100, a method of maintaining each satellite constellation is referred to as a satellite constellation maintaining method.

A method for the artificial satellite 110 of the first satellite constellation 101 to deorbit and drop from its orbit in the first orbital altitude zone is referred to as an orbital dropping method.

The artificial satellite 110 which deorbits is referred to as a deorbiting satellite 103. An orbit from which the deorbiting satellite 103 deorbits is referred to as a breakoff orbit.

In the satellite constellation maintaining method, after implementation of the orbital dropping method, the artificial satellite 110 serving as a replacement of the deorbiting satellite 103 is injected to the breakoff orbit.

The artificial satellite 110 to be injected to the breakoff orbit is referred to as a succeeding satellite.

Figure 3:
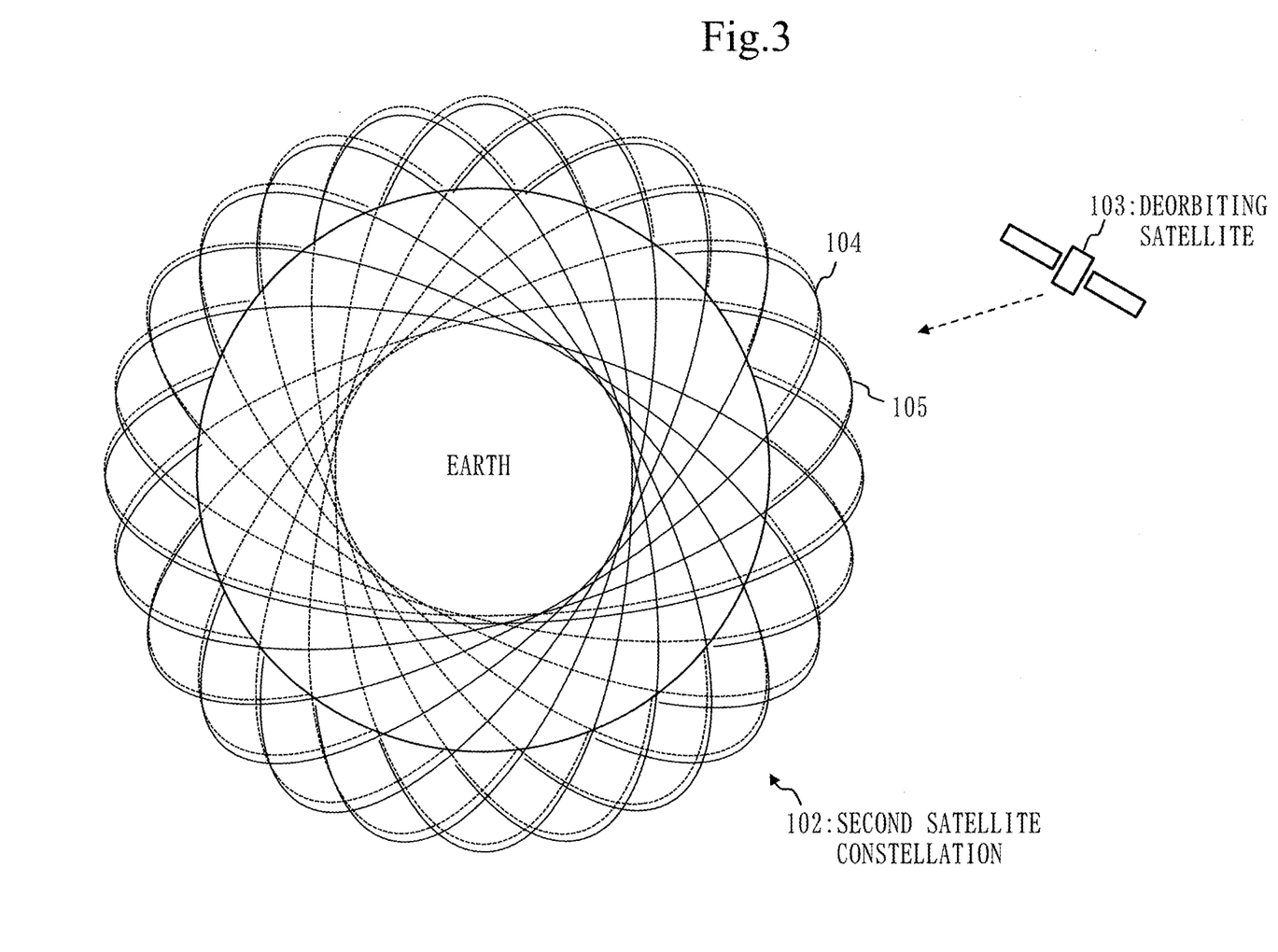
FIG. 3 is a diagram illustrating a state of a second satellite constellation 102 before deorbiting in Embodiment 1.
Figure 4:
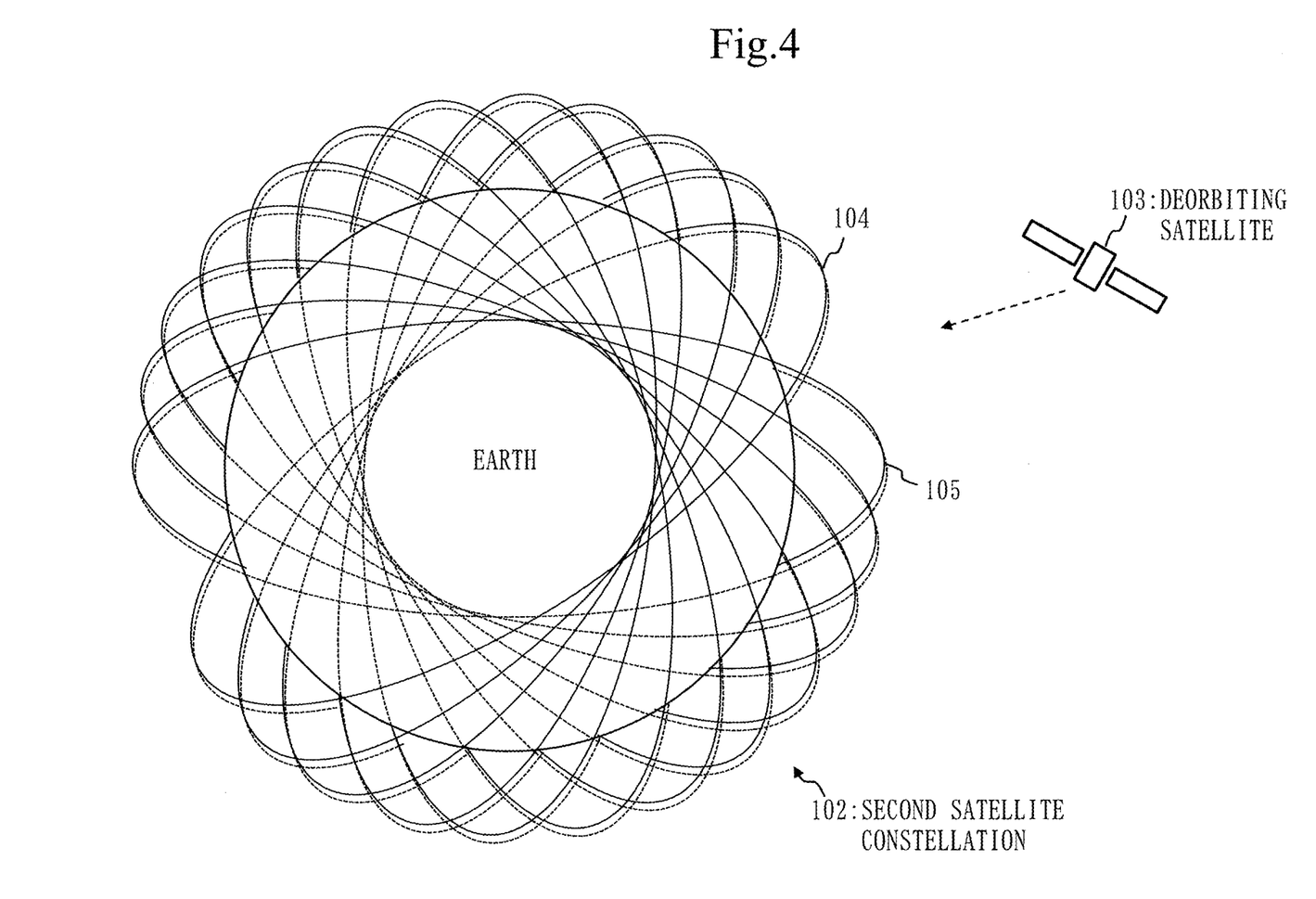
FIG. 4 is a diagram illustrating a state of the second satellite constellation 102 when deorbiting in Embodiment 1.
Figure 5:
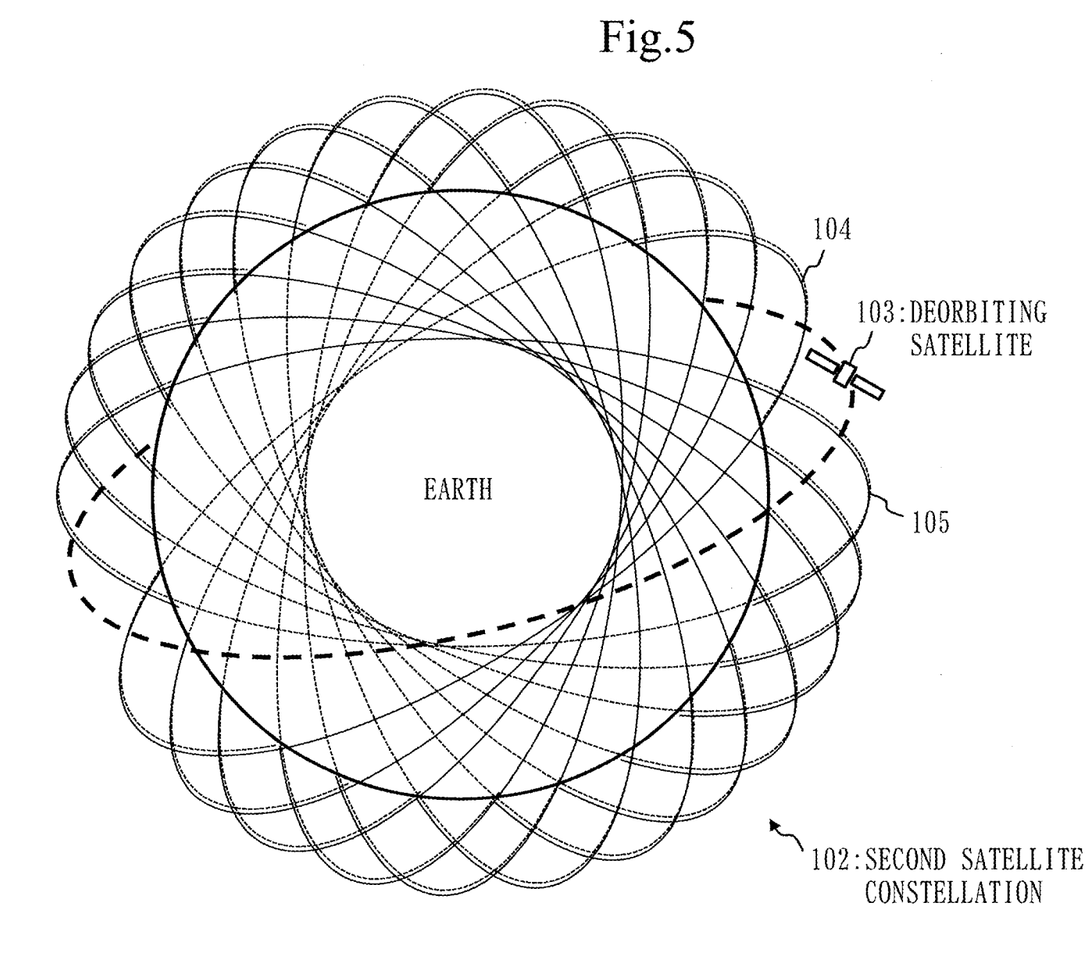
FIG. 5 is a diagram illustrating a state of a deorbiting satellite 103 which deorbits in Embodiment 1.

The orbital dropping method is described based on FIG. 3, FIG. 4, and FIG. 5.

The deorbiting satellite 103 is one of the artificial satellites 110 belonging to the first satellite constellation 101, and deorbits and drops from the orbit in the first orbital altitude zone.

Twelve circles rendered so as to surround the earth represent twelve orbital planes the second satellite constellation 102 forms. However, the number of orbital planes in the second satellite constellation 102 may be equal to or smaller than eleven or may be equal to or more than thirteen.

FIG. 3 illustrates a state of the second satellite constellation 102 before the deorbiting satellite 103 deorbits.

The second satellite constellation 102 forms twelve orbital planes with their directions of normal vectors different from one another.

On the twelve orbital planes, an angle formed between adjacent orbital planes (relative angle) is substantially equal.

A first orbital plane 104 and a second orbital plane 105 are adjacent two orbital planes.

FIG. 4 illustrates a state of the second satellite constellation 102 when the deorbiting satellite 103 deorbits.

The second satellite constellation 102 narrows a relative angle between adjacent two orbital planes except a relative angle between the first orbital plane 104 and the second orbital plane 105, and widens the relative angle between the first orbital plane 104 and the second orbital plane 105.

With this, an area for the deorbiting satellite 103 to pass is allocated in the second orbital altitude zone. The area allocated in the second orbital altitude zone is referred to as a free orbit area.

FIG. 5 illustrates a state in which the deorbiting satellite 103 passes through the free orbit area in the second orbital altitude zone. A broken line indicates a path through which the deorbiting satellite 103 passes.

The deorbiting satellite 103 passes through the free orbit area in the second orbital altitude zone. With this, the deorbiting satellite 103 can safely drops in the second orbital altitude zone.

After the deorbiting satellite 103 deorbits, the succeeding satellite is injected from the ground or another orbit to the breakoff orbit.

With this, the first satellite constellation 101 is maintained even if the deorbiting satellite 103 deorbits.

Deorbiting of the deorbiting satellite 103 is described.

There are two types of deorbiting: PMD and ADR.

PMD is an abbreviation of Post Mission Disposal.

ADR is an abbreviation of Active Debris Removal.

In PMD, the deorbiting satellite 103 performs deorbiting by itself. Specifically, to cause the deorbiting satellite 103 to pass through the free orbit area, the satellite control device 113 controls the dropping speed of the deorbiting satellite 103 by using the propulsion device 111.

The satellite control device 113 may perform control for deorbiting autonomously or by following a command from the ground facility 120.

In ADR, the deorbiting satellite 103 performs deorbiting by a removal satellite. In this case, the satellite constellation system 100 further includes a removal satellite.

The removal satellite is an artificial satellite also called a debris removal satellite. As with the artificial satellite 110, the removal satellite includes a propulsion device, an attitude control device, a satellite control device, and a communication system. Furthermore, the removal satellite includes a capture device. And, the removal satellite operates as follows.

Firstly, the satellite control device controls the propulsion device and the attitude control device to cause the removal satellite to approach the deorbiting satellite 103.

Next, the capture device captures the deorbiting satellite 103.

Then, to cause the removal satellite together with the deorbiting satellite 103 to pass through the free orbit area, the satellite control device controls the dropping speed of the removal satellite by using the propulsion device.

The satellite control device may perform control for deorbiting autonomously or by following a command from the ground facility 120.

Formation of a free orbit area in the second satellite constellation 102 is described.

Firstly, the second satellite constellation 102 sequentially changes orbital altitudes of adjacent orbital planes. With that, with a difference in the revolution period of the orbital plane with a difference in the orbital altitude, the relative angle in a longitudinal direction of the normal vector of the orbital plane gradually changes. With this principle, a vacancy (free orbit area) between orbital planes is formed.

Then, the second satellite constellation 102 returns the orbital altitude of each orbital plane to the original. With that, the revolution periods of the orbital planes become equal, and thus the relative angle in the longitudinal direction of the normal vector of the orbital plane is maintained. That is, in a state in which the free orbit area is formed, a plurality of orbital planes are maintained.

Note that the orbital altitude of the artificial satellite 110 can be changed by changing the speed of the artificial satellite 110. Specifically, the orbital altitude increases when the artificial satellite 110 accelerates, and the orbital altitude decreases when the artificial satellite 110 decelerates. Here, the satellite control device 113 controls the propulsion device 111 to change the speed of the artificial satellite 110.

In each artificial satellite 110 of the second satellite constellation 102, the satellite control device 113 may perform control for forming a free orbit area autonomously or by following a command from the ground facility 120.

Description of Embodiment

The satellite constellation system 100 is configured of hundred or more artificial satellites 110.

The satellite constellation system 100 includes, at each of a plurality of nominal orbital altitudes, a constellation satellite group which performs service operation by causing satellite groups flying at the same nominal orbital altitude to cooperate. The nominal orbital altitude is equivalent to each of the first orbital altitude zone and the second orbital altitude zone. The constellation satellite group is equivalent to each of the first satellite constellation 101 and the second satellite constellation 102.

The satellite constellation maintaining method deorbits the artificial satellite 110 with the completion of life or a failure to allocate a free area, and injects a succeeding satellite to the orbit.

To cause a deorbiting satellite deorbiting and dropping from the first satellite constellation 101 configured at high altitude to safely pass through the orbital altitude zone of the second satellite constellation 102 configured at low altitude, the relative angle between orbital planes is set to be large, and a free orbit area is allocated. Here, the second satellite constellation 102 continues service operation.

The deorbiting satellite 103 or the debris removal satellite includes a propulsion device and a deorbiting and dropping control device. The deorbiting and dropping control device is equivalent to the satellite control device 113 of the deorbiting satellite 103.

Also, the deorbiting satellite 103 (and the debris removal satellite) pass through a free orbit area set by the second satellite constellation 102.

The deorbiting and dropping control device predicts a timing (passage timing) when the deorbiting satellite 103 passes through the free orbit area.

Specifically, based on the orbital altitude of the orbital plane where the deorbiting satellite 103 flies, the deorbiting and dropping control device predicts a time (arrival time) until the deorbiting satellite 103 arrives at the second orbital altitude zone and an angle (revolution angle) at which the second satellite constellation 102 revolves to the longitudinal direction in the arrival time. Furthermore, the deorbiting and dropping control device predicts a passage timing based on the arrival time and the revolution angle.

Then, by operating the propulsion device 111 in tune with the passage timing, the deorbiting and dropping control device causes the deorbiting satellite 103 to pass through the free orbit area.

When the passage timing differs from the prediction due to a prediction error, the deorbiting and dropping control device causes the propulsion device 111 to operate, thereby controlling an orbital dropping speed.

The deorbiting and dropping control device may perform control on the orbit autonomously or may perform control by following a command from the ground facility 120.

When the first satellite constellation 101 and the second satellite constellation 102 are operated by different business entities, the business entity of the first satellite constellation 101 and the business entity of the second satellite constellation 102 share information.

For example, the business entity of the second satellite constellation 102 provides information about the free orbit area to the business entity of the first satellite constellation 101.

The shared information can be transferred to each artificial satellite 110 by intersatellite communication or transmission from the ground facility 120.

Effects of Embodiment 1

Embodiment 1 provides a satellite constellation maintaining method in which a deorbiting satellite at high altitude safely drops from its orbit to pass through the orbital altitude of a mega-constellation satellite group at low altitude.

Normally, in a satellite mega-constellation holding a plurality of satellite groups which operate service in cooperation at a nominal orbital altitude, inclined orbits with similar orbital inclinations are adopted. And, if a satellite with the similar inclined orbital angle passes through a free area between orbital planes when passing through the altitude zone of the satellite group, a collision is avoided.

On the line of intersection of orbital planes with different normal vectors, the risk of a collision with a satellite on another orbital plane remains. However, on the precondition that a virtual satellite group flies on a virtual orbital plane of a second mega-constellation, a collision with a satellite on another orbital plane is avoided. That is, a space between orbital planes is set so that operation continues in which the satellite group of the second mega-constellation avoids a collision in the second mega-constellation and, with an orbital dropping satellite passing at the timing of passing of a virtual satellite, a collision with a satellite on another orbital plane is avoided.

When a plurality of satellite mega-constellations at different orbital altitudes are administered by the same business entity, orbit information of a deorbiting satellite at high altitude and a free orbit area at the orbital altitude of a low-altitude mega-constellation satellite group are grasped in advance. Thus, safe deorbiting can be implemented in a planned manner.

When a plurality of satellite mega-constellations at different orbital altitudes are administered by a plurality of business entities, with the administrative business entity of the second satellite mega-constellation sharing information with the administrative business entity of the first satellite mega-constellation, the orbital dropping satellite passes through the free orbit area, and a collision with a satellite on another orbital plane is thereby avoided. Also, the risk of a collision of the orbital dropping satellite at a random position on a random orbital plane is decreased, and the frequency of issuance of a danger alert is also decreased. Thus, an effect is obtained in which the second satellite mega-constellation is not required to interrupt service operation and take a risk-averse action.

A company has a plan in which a mega-constellation satellite group with approximately 2500 satellites is set up at each of three orbital altitudes near 340 kilometers and a mega-constellation satellite group with several thousand satellites is further set up at each of an orbital altitude of 550 kilometers and an orbital altitude of 1050 kilometers.

In this plan, it is required to avoid a collision when a satellite at an orbital altitude of 550 kilometers or 1050 kilometers drops from the orbit to pass through the three orbital altitudes near 340 kilometers. Also at an altitude zone near 340 kilometers, a satellite at high altitude is required to drop from the orbit without colliding with a satellite group at low altitude.

These mega-constellation groups adopt inclined orbits with similar orbital inclinations.

For this satellite constellation system, the satellite constellation maintaining method of Embodiment 1 exerts an effect in which, when a satellite at a similar inclined orbital angle passes through an altitude zone of a satellite group, the satellite passes through a free area between orbital planes, thereby avoiding a collision.

Embodiment 1 is an example of a preferred mode and is not intended to limit the technical scope of the present disclosure. Embodiment 1 may be partially implemented or may be implemented in combination with another mode.

Embodiment 2

Figure 6:
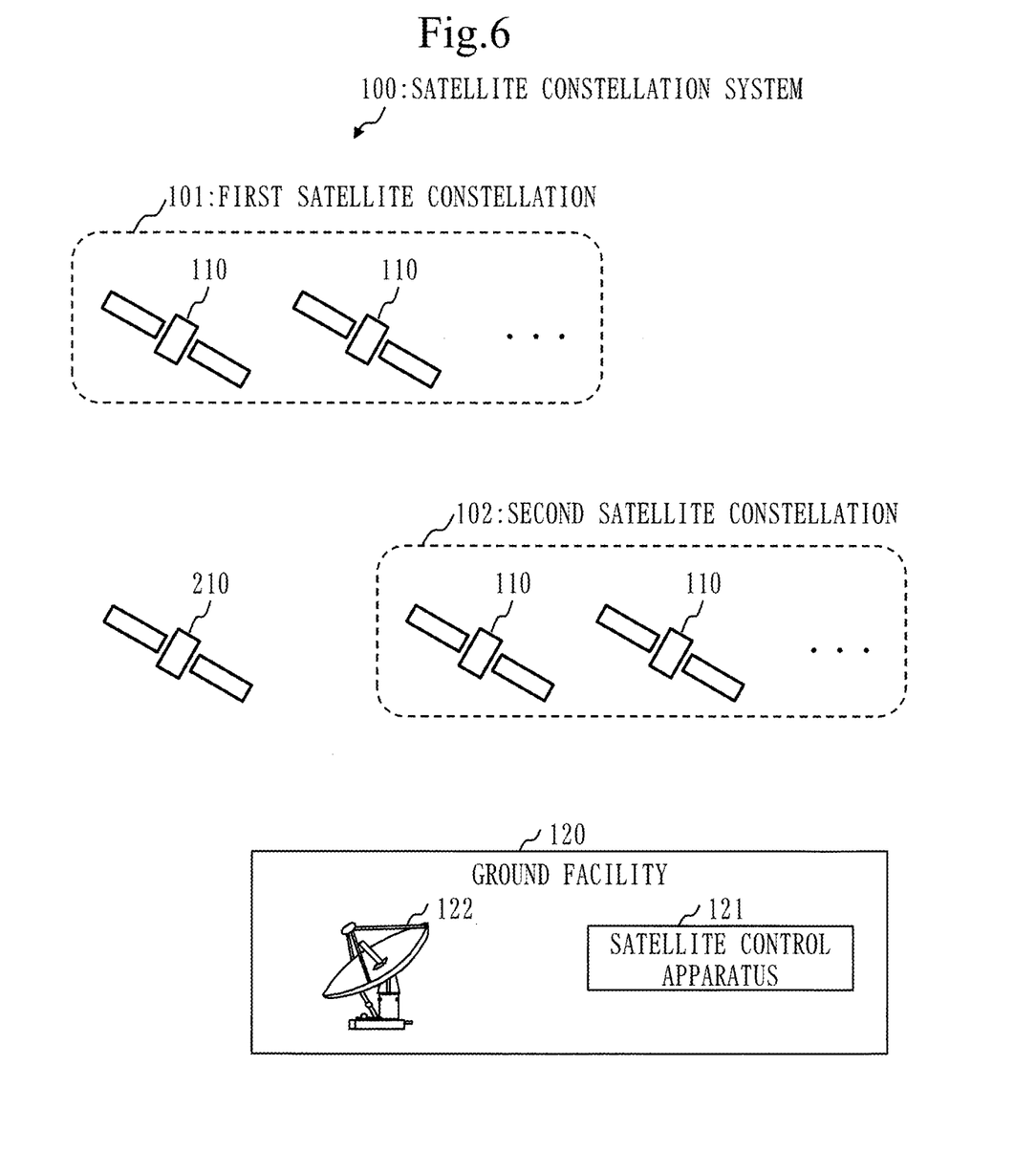
FIG. 6 is a diagram of structure of the satellite constellation system 100 in Embodiment 2.
Figure 7:
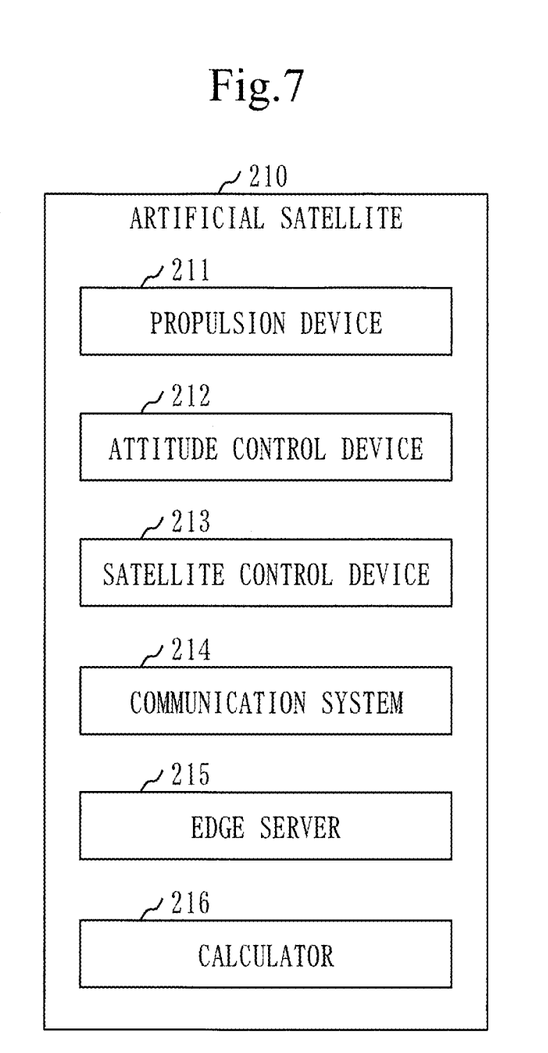
FIG. 7 is a diagram of structure of an artificial satellite 210 in Embodiment 2.

As for a mode in which the artificial satellite 210 generates and transmits a command for each artificial satellite 110, points different from Embodiment 1 are mainly described based on FIG. 6 and FIG. 7.

Description of Structure

The structure of the satellite constellation system 100 is described based on FIG. 6.

The satellite constellation system 100 includes an artificial satellite 210.

The artificial satellite 210 is the artificial satellite 110 belonging to the first satellite constellation 101, the artificial satellite 110 belonging to the second satellite constellation 102, or another artificial satellite. For example, the artificial satellite 210 is the deorbiting satellite 103 or the succeeding satellite.

Each of the artificial satellite 110 belonging to the first satellite constellation 101 and the artificial satellite 110 belonging to the second satellite constellation 102 may be the artificial satellite 210.

The structure of the artificial satellite 210 is described based on FIG. 7.

The artificial satellite 210 includes a propulsion device 211, an attitude control device 212, a satellite control device 213, a communication system 214, an edge server 215, and a calculator 216.

The propulsion device 211 is equivalent to the propulsion device 111.

The attitude control device 212 is equivalent to the attitude control device 112.

The satellite control device 213 is equivalent to the satellite control device 113.

The communication system 214 is equivalent to the communication system 114. That is, the communication system 214 includes a communication device such as a satellite-targeted communication device and a ground-targeted communication device.

The edge server 215 is a computer including a processing circuitry, an input/output interface, and a database.

In the database, orbit information of each of the artificial satellite 110 belonging to the first satellite constellation 101 and the artificial satellite 110 belonging to the second satellite constellation 102 is recorded.

The calculator 216 is a computer including a processing circuitry and a database.

Description of Operation

The calculator 216 generates a command for controlling any artificial satellite 110 with reference to the database of the edge server 215 by using artificial intelligence (AI). Any artificial satellite 110 may be its own artificial satellite 110.

The communication system 214 transmits the generated command to each artificial satellite 110. The command may be transmitted directly to the artificial satellite 110 as a transmission destination or may be transmitted via another artificial satellite 110 or the ground facility 120 to the artificial satellite 110 as a transmission destination.

The command as described below is generated and transmitted.

To allocate a free orbit area in the second orbital altitude zone, the calculator 216 generates a command for controlling each artificial satellite 110 of the second satellite constellation 102.

The communication system 214 transmits the generated command to each artificial satellite 110 of the second satellite constellation 102.

To cause the deorbiting satellite 103 to deorbit from the orbit in the first orbital altitude zone and pass through the free area in the second orbital altitude zone, the calculator 216 generates a command for controlling the deorbiting satellite 103.

The communication system 214 transmits the generated command to the deorbiting satellite 103.

To inject a succeeding satellite to the orbit in the first orbital altitude zone, the calculator 216 generates a command for controlling the succeeding satellite.

The communication system 214 transmits the generated command to the succeeding satellite.

Effects of Embodiment 2

To achieve the satellite constellation maintaining method, the artificial satellite 210 includes the edge server 215 and AI.

With the orbit information of the artificial satellites 110 configuring the satellite constellation stored in the edge server 215, on-board updating of the orbit information can be made.

When a backup satellite is injected to the orbit at a dropout orbital position, it is required to generate a safe control command based on previous injection experiences so that an unexpected collision accident does not occur in the course of injection to the orbit. Thus, machine learning is performed by AI on previously-successful commands for injection to the orbit. With this, safe injection to the orbit can be achieved. Also, by making command generation autonomous, ground operation works are saved.

Supplement to Embodiment 2

As a scheme for achieving a distributed architecture, edge computing has attracted attention in which an edge server is arranged on an IoT side. IoT is an abbreviation of Internet of Things.

In the conventional IoT, a centralized mechanism has been generally applied, in which data collected by sensors is transmitted via the Internet to a cloud for data analysis.

By contrast, in edge computing, a mechanism is taken in which data processing is performed as distributed at the device main body or an edge server installed between the device and the cloud. With this, realtime and low-load data processing is implemented Further, with sophistication of information society and an increase in the amount of information, measures regarding consumed power and measures against exhaust heat have become problems. In particular, in a centralized mechanism, measures for a supercomputer and a large-sized data center have become serious problems.

On the other hand, in outer space, heat can be exhausted into deep space by radiational cooling. Thus, a mechanism as follows is rational. By regarding the satellite as a device in IoT, an edge server is arranged on a satellite constellation side. And, after distributed computing process is performed in the orbit, only necessary data is transferred to the ground.

Artificial intelligence (AI) performs machine learning of a deviation (for example, maximum deviation) of points of intersection based on previous points of intersection of a self orbital plane and each counterpart orbital plane. Then, the calculator 216 detects a collision risk by artificial intelligence after machine learning. Specifically, the calculator 216 detects the presence of a counterpart satellite passing in a range of a deviation centering on the point of intersection at a future time when the self satellite passes through the point of intersection.

The number of artificial satellites 210 including the edge server 215 and AI may be one or two or more. All satellites may be the artificial satellites 210. With information about all satellites shared by using a communication line and with an analysis conducted with a common algorithm, the plurality of satellites can mutually cooperate while independently making autonomous determinations.

The artificial satellite 210 including the edge server 215 and AI may autonomously generate and execute a command for its own satellite.

A satellite not exerting a satellite function may be identified by the ground facility 120 and identification information may be transmitted from the ground facility 120. With telemetry information, an anomaly may be detected on the orbit.

Summary of Embodiment 2

The scale of mega-constellation is increasing as gaining steam to reach fifty thousand satellites in total. Thus, it is an urgent matter to establish a method in which a satellite deorbiting with alternation of generations passes through an orbital altitude of a mega-constellation without colliding with another satellite.

In Embodiment 2, deorbiting and dropping control as described below is performed. With deorbiting and dropping control, a free orbit area is allocated in a low-altitude mega-constellation, and a deorbiting satellite of a high-altitude mega-constellation passes through the free orbit area. For the purpose of this, with the use of AI in space, an artificial satellite autonomously transmits a command to the deorbiting satellite and a stationary operation satellite.

The artificial satellite includes an edge server and an AI calculator.

In the edge server, a database with orbit information of satellites (including its own satellite) configuring a satellite constellation (especially, the second satellite constellation) recorded therein is stored.

With reference to the database of the edge server, the AI calculator generates a command for controlling any satellite configuring the satellite constellation.

The artificial satellite operates as follows by using the edge server and the AI calculator.

The artificial satellite generates a command for allocating a free orbit area in the second orbital altitude zone, and transmits the generated command to an artificial satellite of the second satellite constellation.

The artificial satellite generates a command for deorbiting, and transmits the generated command to a deorbiting satellite.

The artificial satellite generates a command for injecting a succeeding satellite to the orbit in the first orbital altitude zone, and transmits the generated command to the succeeding satellite.

The artificial satellite configures the second satellite constellation, and allocates a free orbit area in the second orbital altitude zone.

The artificial satellite is a deorbiting satellite, and autonomously allocates a free orbit area in the second orbital altitude zone.

The artificial satellite is a succeeding satellite, and allocates a free orbit area in the second orbital altitude zone.

REFERENCE SIGNS LIST

100: satellite constellation system; 101: first satellite constellation; 102: second satellite constellation; 103: deorbiting satellite; 104: first orbital plane; 105: second orbital plane; 110: artificial satellite; 111: propulsion device; 112: attitude control device; 113: satellite control device; 114: communication system; 120: ground facility; 121: satellite control apparatus; 122: communication apparatus; 210: artificial satellite; 211: propulsion device; 212: attitude control device; 213: satellite control device; 214: communication system; 215: edge server; 216: calculator

The invention claimed is:

1. A satellite constellation maintaining method, comprising:
operating a first satellite constellation having a plurality of artificial satellite groups in a first orbital altitude zone;
operating a second satellite constellation in a second orbital altitude zone lower than the first orbital altitude zone, the second satellite constellation forming a plurality of orbital planes;
deorbiting and dropping a deorbiting satellite from an orbit of the first orbital altitude zone while the second satellite constellation widens a relative angle of adjacent first and second orbital planes of the plurality of orbital planes in a deorbiting path of the deorbiting satellite and narrows other orbital planes of the plurality of orbital planes to allocate a free orbit area in the second orbital altitude zone, the deorbiting satellite being one of artificial satellites belonging to the first satellite constellation;
causing the deorbiting satellite to pass through the free orbit area of the second orbital altitude zone;
inserting a succeeding satellite to the orbit of the first orbital altitude zone, the succeeding satellite is an artificial satellite serving as a replacement of the deorbiting satellite; and then
returning the second satellite constellation to an original orbital altitude of each orbital plane to an original position.

2. The satellite constellation maintaining method according to claim 1, wherein
the deorbiting satellite includes a propulsion device and a satellite control device, and
the method further comprises controlling, by the satellite control device, a dropping speed of the deorbiting satellite by using the propulsion device to cause the deorbiting satellite to pass through the free orbit area.

3. The satellite constellation maintaining method according to claim 1, wherein
the method further comprises:
capturing, by a removal satellite, the deorbiting satellite, the removal satellite including a propulsion device and a satellite control device; and
controlling, by the satellite control device, a dropping speed of the removal satellite by using the propulsion device to cause the removal satellite together with the deorbiting satellite to pass through the free orbit area, and
the removal satellite is part of the first satellite constellation or the second satellite constellation.

4. A satellite constellation to be used as the first satellite constellation in the satellite constellation maintaining method according to claim 1.

5. A satellite constellation to be used as the second satellite constellation in the satellite constellation maintaining method according to claim 1.

6. An orbital dropping method, comprising:
operating a first satellite constellation having a plurality of artificial satellite groups in a first orbital altitude zone;
operating a second satellite constellation in a second orbital altitude zone lower than the first orbital altitude zone, the second satellite constellation forming a plurality of orbital planes;
deorbiting and dropping a deorbiting satellite from an orbit of the first orbital altitude zone while the second satellite constellation widens a relative angle of adjacent first and second orbital planes of the plurality of orbital planes in a deorbiting path of the deorbiting satellite and narrows other orbital planes of the plurality of orbital planes to allocate a free orbit area in the second orbital altitude zone, the deorbiting satellite being one of artificial satellites belonging to the first satellite constellation; and
causing the deorbiting satellite to pass through the free orbit area of the second orbital altitude zone.

7. The orbital dropping method according to claim 6, wherein
the deorbiting satellite includes a propulsion device and a satellite control device, and
method further comprises controlling, by the satellite control device, a dropping speed of the deorbiting satellite by using the propulsion device to cause the deorbiting satellite to pass through the free orbit area.

8. The orbital dropping method according to claim 6, wherein
the method further comprises:
capturing, by a removal satellite, the deorbiting satellite, the removal satellite including a propulsion device and a satellite control device; and controlling, by the satellite control device, a dropping speed of the removal satellite by using the propulsion device to cause the removal satellite together with the deorbiting satellite to pass through the free orbit area, and the removal satellite is part of the first satellite constellation or the second satellite constellation.

9. A satellite constellation to be used as the first satellite constellation in the orbital dropping method according to claim 6.

10. A satellite constellation to be used as the second satellite constellation in the orbital dropping method according to claim 6.

11. A satellite constellation system comprising:
a first satellite constellation having a plurality of artificial satellite groups in a first orbital altitude zone; and
a second satellite constellation in a second orbital altitude zone lower than the first orbital altitude zone, the second satellite constellation forming a plurality of orbital planes, wherein
when a deorbiting satellite deorbits and drops from an orbit of the first orbital altitude zone, the second satellite constellation widens a relative angle of adjacent first and second orbital planes of the plurality of orbital planes in a deorbiting path of the deorbiting satellite and narrows other orbital planes of the plurality of orbital planes to allocate a free orbit area in the second orbital altitude zone, the deorbiting satellite being one of artificial satellites belonging to the first satellite constellation, and
the deorbiting satellite passes through the free orbit area of the second orbital altitude zone.

12. A satellite constellation, wherein
the satellite constellation is operated in a second orbital altitude zone lower than a first orbital altitude zone where another satellite constellation is operated, and forms a plurality of orbital planes, and
when a deorbiting satellite, which is one of artificial satellites belonging to the another satellite constellation, deorbits and drops from an orbit of the first orbital altitude zone, the satellite constellation widens a relative angle of adjacent first and second orbital planes of the plurality of orbital planes in a deorbiting path of the deorbiting satellite and narrows other orbital planes of the plurality of orbital planes to allocate, in the second orbital altitude zone, a free orbit area for the deorbiting satellite to pass through.

13. An artificial satellite to be used for the satellite constellation maintaining method according to claim 1, the artificial satellite comprising:
an edge server having a database with orbit information of each of artificial satellites belonging to the first satellite constellation and artificial satellites belonging to the second satellite constellation recorded therein;
a calculator to generate, with reference to the database of the edge server, a command for controlling each of the artificial satellites of the second satellite constellation by using artificial intelligence to allocate the free orbit area in the second orbital altitude zone; and
a communication device to transmit the generated command to each of the artificial satellites of the second satellite constellation.

14. An artificial satellite to be used for the satellite constellation maintaining method according to claim 1, the artificial satellite comprising:
an edge server having a database with orbit information of each of artificial satellites belonging to the first satellite constellation and artificial satellites belonging to the second satellite constellation recorded therein;
a calculator to generate, with reference to the database of the edge server, a command for controlling the deorbiting satellite by using artificial intelligence to cause the deorbiting satellite to deorbit from the orbit of the first orbital altitude zone and pass through the free orbit area of the second orbital altitude zone; and
a communication device to transmit the generated command to the deorbiting satellite.

15. An artificial satellite to be used for the satellite constellation maintaining method according to claim 1, the artificial satellite comprising:
an edge server having a database with orbit information of each of artificial satellites belonging to the first satellite constellation and artificial satellites belonging to the second satellite constellation recorded therein;
a calculator to generate, with reference to the database of the edge server, a command for controlling the succeeding satellite by using artificial intelligence to inject the succeeding satellite to the orbit of the first orbital altitude zone; and
a communication device to transmit the generated command to the succeeding satellite.

16. An artificial satellite belonging to the second satellite constellation in the satellite constellation maintaining method according to claim 1, the artificial satellite comprising:
an edge server having a database with orbit information of each of artificial satellites belonging to the second satellite constellation recorded therein;
a calculator to generate, with reference to the database of the edge server, a command for controlling each of the artificial satellites of the second satellite constellation by using artificial intelligence to allocate the free orbit area in the second orbital altitude zone; and
a communication device to transmit the generated command to each of the artificial satellites of the second satellite constellation.

17. An artificial satellite serving as the deorbiting satellite in the satellite constellation maintaining method according to claim 1, the artificial satellite comprising:
an edge server having a database with orbit information of each of artificial satellites belonging to the second satellite constellation recorded therein;
a calculator to generate, with reference to the database of the edge server, a command for controlling each of the artificial satellites of the second satellite constellation by using artificial intelligence to allocate the free orbit area in the second orbital altitude zone; and
a communication device to transmit the generated command to each of the artificial satellites of the second satellite constellation.

18. An artificial satellite belonging to the second satellite constellation in the satellite constellation maintaining method according to claim 1 and serving as the succeeding satellite, the artificial satellite comprising:
an edge server having a database with orbit information of each of artificial satellites belonging to the second satellite constellation recorded therein;
a calculator to generate, with reference to the database of the edge server, a command for controlling each of the artificial satellites of the second satellite constellation by using artificial intelligence to allocate the free orbit area in the second orbital altitude zone; and a communication device to transmit the generated command to each of the artificial satellites of the second satellite constellation.

19. The satellite constellation maintaining method according to claim 1, wherein
to widen the relative angle between the first orbital plane and the second orbital plane, the second satellite constellation sequentially changes orbital altitudes of the first orbital plane and the second orbital plane to cause a difference in a revolution period for each of the first orbital plane and the second orbital plane.

20. The orbital dropping method according to claim 6, wherein
to widen the relative angle between the first orbital plane and the second orbital plane, the second satellite constellation sequentially changes orbital altitudes of the first orbital plane and the second orbital plane to cause a difference in a revolution period for each of the first orbital plane and the second orbital plane.

* * * * *